(12) United States Patent
Eichhorn et al.

(10) Patent No.: US 6,328,367 B1
(45) Date of Patent: Dec. 11, 2001

(54) INTERIOR COVERING PART, PARTICULARLY AN INSTRUMENT PANEL FOR MOTOR VEHICLES

(75) Inventors: Horst Eichhorn, Tamm; Bernd Gayer, Weissach; Leo Linder, Vöhringen, all of (DE)

(73) Assignee: Dr. Ing. h.c.F. Porsche Aktiengessellschaft, Stuttgart (DE)

( * ) Notice: Subject to any disclaimer, the term of this patent is extended or adjusted under 35 U.S.C. 154(b) by 0 days.

(21) Appl. No.: 09/531,674

(22) Filed: Mar. 20, 2000

(30) Foreign Application Priority Data

Mar. 18, 1999 (DE) .............................. 199 12 107

(51) Int. Cl.⁷ .................................. B62D 25/14
(52) U.S. Cl. .................. 296/70; 280/728.3; 280/732
(58) Field of Search .................. 280/728.3, 731, 280/732; 296/70, 72

(56) References Cited

U.S. PATENT DOCUMENTS

| | | | |
|---|---|---|---|
| 5,498,027 | 3/1996 | Kelley et al. | 280/728.3 |
| 5,544,912 | 8/1996 | Sommer | 280/728.3 |
| 5,806,880 | * 9/1998 | Gray | 280/728.3 |
| 5,863,062 | * 1/1999 | Harada et al. | 280/728.3 |
| 5,901,977 | * 5/1999 | Knox et al. | 280/728.3 |
| 6,045,153 | * 4/2000 | Sommer et al. | 280/728.3 |
| 6,079,733 | * 6/2000 | Towler | 280/728.3 |

FOREIGN PATENT DOCUMENTS

| | | |
|---|---|---|
| 196 23 579 A1 | 12/1997 | (DE) . |
| 0 771 695 A1 | 5/1997 | (EP) . |

\* cited by examiner

*Primary Examiner*—Joseph D. Pape
*Assistant Examiner*—Paul Chenevert
(74) *Attorney, Agent, or Firm*—Crowell & Moring, LLP

(57) ABSTRACT

An interior covering part, particularly an instrument panel for motor vehicles, has a member which is covered by a foil and is constructed integrally with a flap covering an opening for passage of an air bag when the air bag is triggered. The flap is also covered by the foil and is marked by a weakening and/or perforation along its edge. On its side facing a vehicle occupant compartment, the interior covering part is provided with a laminated-on decorative layer which is slotted on the side situated opposite a hypothetical folding axis as well as in areas on both adjoining upright sides of the flap. The slotted areas of the decorative layer are covered by a fitted-on strip.

10 Claims, 3 Drawing Sheets

INTERIOR COVERING PART, PARTICULARLY AN INSTRUMENT PANEL FOR MOTOR VEHICLES

This application claims the priority of German application 199 12 107.9, filed Mar. 18, 1999, the disclosure of which is expressly incorporated by reference herein.

BACKGROUND AND SUMMARY OF THE INVENTION

The present invention relates to an interior covering part, particularly an instrument panel for a motor vehicle, including a member which is covered by a foil and a flap covering an opening for passage of an air bag when the air bag is triggered. The member is constructed integrally with the flap, and the flap is also covered by the foil and marked, by at least one of a weakening and a perforation, along its edge.

An interior covering part, formed by an instrument panel for a motor vehicle, is known from European Patent Document EP 0 771 695 A1. This known interior covering part consists of a member which is covered by a foil and which is constructed integrally with a flap covering the opening for the passage of an air bag when the air bag is triggered. The flap is also covered by the foil and is marked by a weakening and/or a perforation along its edge.

It is an object of this invention to further develop an interior covering part of the initially mentioned type such that the part can be provided with a laminated-on decorative layer on the side facing the vehicle occupant compartment and so that a fast and well defined opening of the flap is ensured when the air bag is triggered in spite of the presence of the laminated-on decorative layer. Additionally, it is an object to have the weakening and/or perforation of the flap not be visible from the vehicle occupant compartment.

According to the invention, these objects are achieved by providing, on a side facing a vehicle occupant compartment, the interior covering part with a particular laminated-on decorative layer. The decorative layer is slotted only in a slotted area on a side thereof situated opposite a hypothetical folding axis and in areas on both adjoining upright sides of the flap. The slotted areas of the decorative layer are covered by a fitted-on strip. Additional characteristics which are advantageously included in the invention are also claimed.

A principal advantage achieved by the invention is that the interior covering part can be provided, in a simple manner, with an improved decorative layer made of leather or the like. The decorative layer, in the area of the tear line, does not have to be provided with a perforation by way of a laser. Instead, the decorative layer is slotted only locally, the slotted areas facing away from a hypothetical folding axis of the flap being covered by a fitted-on strip. The transversely extending slotted area and the two upright slotted areas on the decorative layer have short lengths and act as defined tear lines when the air bag is triggered. The preferably leather-covered integral flap, therefore, opens in a rapid and well-defined manner. In the inoperative position of the air bag, no tear line on the instrument panel is visible from the vehicle occupant compartment.

The invention is illustrated in the drawings and will be described in detail in the following.

DESCRIPTION OF THE PREFERRED EMBODIMENTS

Figure 1:
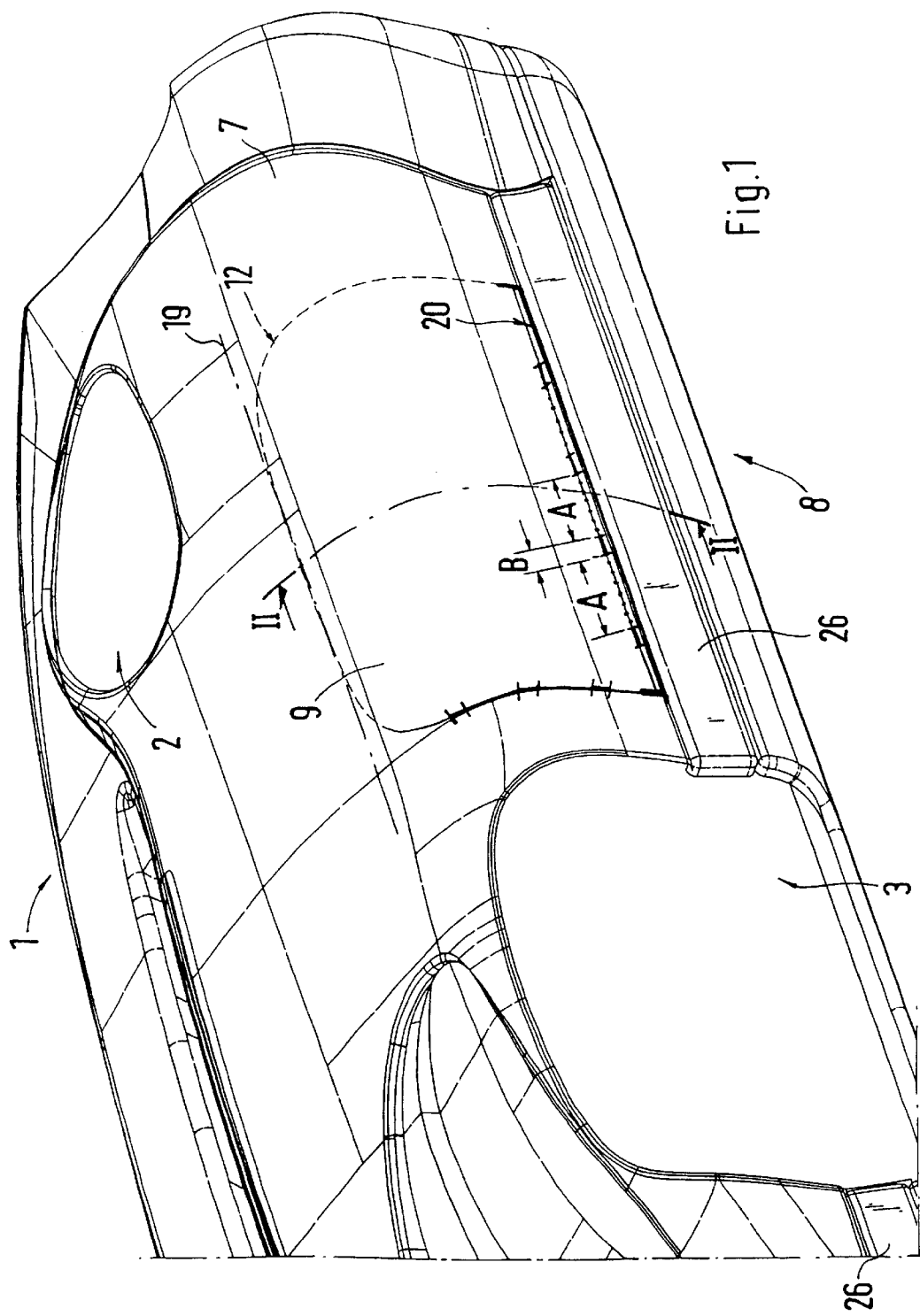
FIG. 1 is a perspective partial view of an interior covering part for a motor vehicle, formed by an instrument panel, having an integral flap for an air bag.
Figure 2:
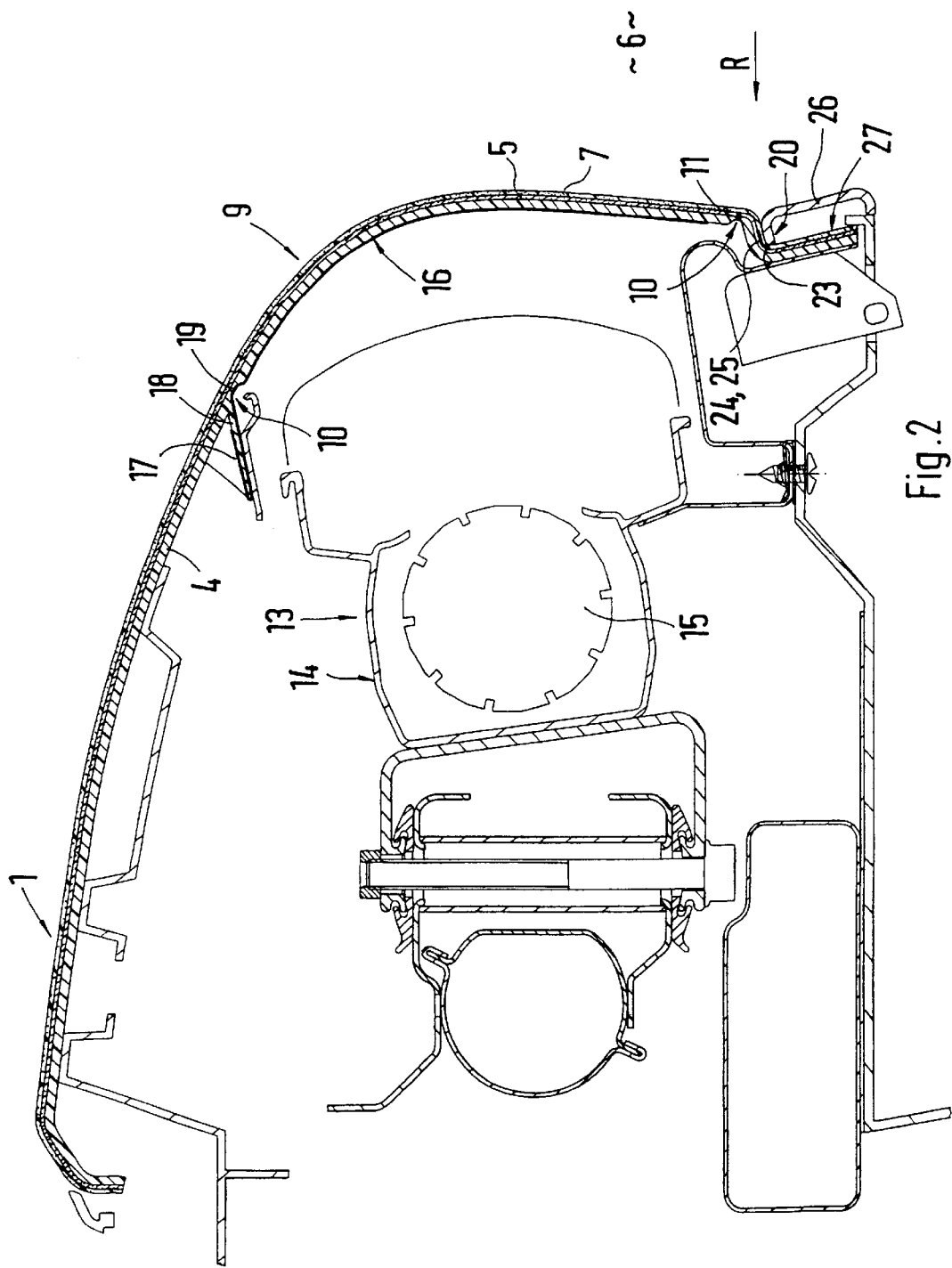
FIG. 2 is an enlarged sectional view along line II—II of FIG. 1.
Figure 3:
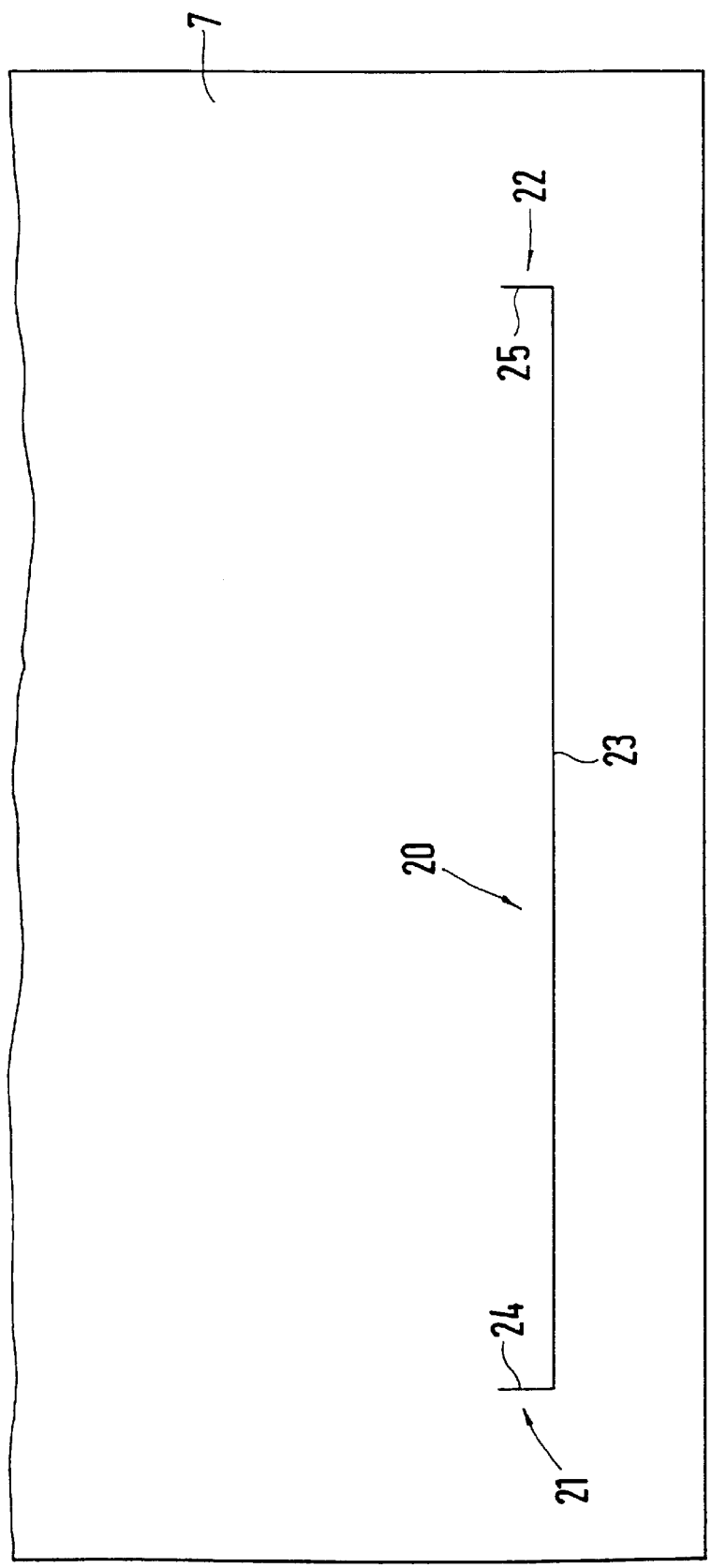
FIG. 3 is a view in the direction of the arrow R of FIG. 2, the slotted areas being illustrated in the stretched-out position of the decorative layer.

FIG. 1 illustrates areas of an instrument panel 1 for a motor vehicle forming an interior covering part. A loudspeaker, which is not shown in detail, can be inserted into an upper lateral recess 2 in the instrument panel, and an operating unit, which is not shown, can be inserted into a central lower recess 3.

The instrument panel 1 includes a member 4 which is covered by a foil 5. The member 4 is formed by an injection-molded thermoplastic (such as PP) and has a thickness of from 2 to 2.5 mm.

A foam and foil combination is provided as the foil 5 and is composed of a foam layer and a cover layer. In addition, on its side facing a vehicle occupant compartment 6, the instrument panel has a decorative layer 7 which is laminated onto the foil 5. The decorative layer 7 preferably consists of leather. However, the decorative layer may also be formed by imitation leather, a TPO foil or the like.

A flap 9 is arranged on the front passenger side 8 of the instrument panel 1. The flap 9 is integral with the member 4 and has a circumference which is marked by a weakening 10 and/or a perforation 11. The weakening 10 and/or the perforation 11 form a defined tear line 12 for the flap 9. An air bag system 13 is arranged behind the flap 9 inside the instrument panel 1. The air bag system 13 is composed, in a conventional manner, of a housing 14, an inflating device 15, and an inflatable air bag which is not shown in detail.

On a side of the flap 9 facing away from the vehicle occupant compartment 6, the flap 9 is provided with a thin-walled member part 16, made of sheet steel or aluminum sheet, or with a welded-on plastic/kevlar woven fabric. A U-shaped bent upper end area 17 of the member part 16 surrounds a bent web 18 of the member 4 on the end side. The weakening 10 of the member 4 is formed by a surrounding groove-shaped cross-sectional reduction, whereby a defined tear line 12 is provided for the flap 9.

The interior member part 16 with the U-shaped upper end area 17 and the upper transversely extending area of the groove-shaped cross-sectional reduction virtually forms a hypothetical folding axis 19 for the flap 9 opening in the upward direction when the air bag 13 is triggered. In addition, the member 4 and the foil 5 disposed in front of the member are perforated jointly at points along the cross-sectional reduction defining the tear line 12 by way of a laser. Specifically, the member and the foil are perforated such that one unperforated zone B respectively extends between two spaced perforated zones A. The perforation 11 extends along the lower edge and the two lateral edges of the flap 9.

The decorative layer 7 made of leather has no perforation made by a laser. To permit the flap 9 of the instrument panel 1 provided with a decorative layer 7 made of leather to open up in a rapid, reliable and well defined manner when the air bag 13 is triggered, the decorative layer 7 made of leather is slotted on the side 20 of the flap 9 facing away from the hypothetical folding axis 19 as well as on both adjoining lateral edges 21, 22. The slotted areas 23, 24, and 25 are covered by a fitted-on transversely extending strip 26 toward the vehicle occupant compartment 6. In the area of the fitted-on strip 26, the instrument panel 1 has a depression 27.

In the embodiment illustrated, the folding axis 19 is provided on the upper edge of the flap 9, and the slotted area of the decorative layer 7 extends continuously adjacent to the transversely extending lower edge area of the flap 9 as well as in areas on both upright sides of the flap 9. Each of the lateral slotted areas 24, 25 has a length of only approximately 8 to 10 mm and directly adjoins the continuous transversely extending slotted area 23.

In the illustrated embodiment, the transversely extending slotted lower area 23 of the decorative layer 7 made of leather is situated slightly lower than the adjoining lower edge of the flap 9 which is defined by the weakening 10.

Finally, in the illustrated embodiment, the leather decorative layer 7 for the instrument panel 1, in the area of the strip 26, is separated into an upper part and a lower part. The separating point is covered by the strip 26.

An arrangement according to the invention may also be provided in a door covering or a side wall covering if an air bag for the driver, a front seat passenger or a rear seat passenger is accommodated in the door or side wall.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Interior covering part, particularly an instrument panel for motor vehicles, comprising:

a member which is covered by a foil, and a flap covering an opening for passage of an air bag when the air bag is triggered, said member being constructed integrally with said flap, said flap being also covered by the foil and marked by at least one of a weakening and a perforation along its edge, wherein, on a side facing a vehicle occupant compartment, the interior covering part is provided with a laminated-on decorative layer, the decorative layer being leather, slotted in a lower transversely extending slotted area, having a continuous construction, on a side thereof situated opposite a hypothetical folding axis, and slotted in two lateral slotted areas which are aligned approximately at right angles to and which directly adjoin the transversely extending slotted area, said laminated layer including no other slotted areas except the lower transversely extending and the lateral slotted areas, and wherein the slotted areas are covered only by a fitted-on strip.

2. Interior covering part according to claim 1, wherein the hypothetical folding axis of the flap extends along an upper transversely extending edge of the flap.

3. Interior covering part according to claim 2, wherein the slotted areas of the decorative layer are provided adjacent to a lower edge of the flap.

4. Interior covering part according to claim 2, wherein the lateral slotted areas have a longitudinal course of approximately 8 to 10 mm.

5. Interior covering part according to claim 2, and further comprising a thin-walled interior member part by which the flap is connected to a bent web of the member of the instrument panel.

6. Interior covering part according to claim 1, wherein the slotted areas of the decorative layer are provided adjacent to a lower edge of the flap.

7. Interior covering part according to claim 6, wherein the lateral slotted areas have a longitudinal course of approximately 8 to 10 mm.

8. Interior covering part according to claim 6, and further comprising a thin-walled interior member part by which the flap is connected to a bent web of the member of the instrument panel.

9. Interior covering part according to claim 1, wherein the lateral slotted areas hve a longitudinal course of approximately 8 to 10 mm.

10. Interior covering part according to claim 1, and further comprising a thin-walled interior member part by which the flap is connected to a bent web of the member of the instrumental panel.

* * * * *